US011598732B2

(12) United States Patent
He et al.

(10) Patent No.: US 11,598,732 B2
(45) Date of Patent: Mar. 7, 2023

(54) IMAGING SYSTEM AND METHOD FOR SPECIMEN DETECTION

(71) Applicant: Focus-eBeam Technology (Beijing) Co., Ltd., Beijing (CN)

(72) Inventors: Wei He, Beijing (CN); Shuai Li, Beijing (CN)

(73) Assignee: Focus-eBeam Technology (Beijing) Co., Ltd., Beijing (CN)

( * ) Notice: Subject to any disclaimer, the term of this patent is extended or adjusted under 35 U.S.C. 154(b) by 387 days.

(21) Appl. No.: 17/052,900

(22) PCT Filed: Sep. 3, 2018

(86) PCT No.: PCT/CN2018/103852
§ 371 (c)(1),
(2) Date: Nov. 4, 2020

(87) PCT Pub. No.: WO2020/019409
PCT Pub. Date: Jan. 30, 2020

(65) Prior Publication Data
US 2021/0231589 A1    Jul. 29, 2021

(30) Foreign Application Priority Data

Jul. 26, 2018 (CN) .......................... 201810837831.2
Jul. 26, 2018 (CN) .......................... 201821196445.1

(51) Int. Cl.
*G01N 23/046* (2018.01)
*G06T 7/55* (2017.01)
(Continued)

(52) U.S. Cl.
CPC ....... *G01N 23/046* (2013.01); *G01N 23/2251* (2013.01); *G06T 7/55* (2017.01);
(Continued)

(58) Field of Classification Search
CPC ............. G01N 23/046; G01N 23/2251; G01N 2223/401; G01N 2223/418;
(Continued)

(56) References Cited

U.S. PATENT DOCUMENTS

| 6,744,572 B1 | 6/2004 | McCormick |
| 9,127,529 B2 | 9/2015 | Guzman et al. |
| 2013/0335817 A1* | 12/2013 | Isobe ..................... G02B 21/04 |
| | | 359/364 |
| 2014/0119497 A1 | 5/2014 | Guzman et al. |
| 2015/0138532 A1 | 5/2015 | Goodman et al. |

FOREIGN PATENT DOCUMENTS

| CN | 104833659 A | 8/2015 |
| CN | 104903711 A | 9/2015 |

(Continued)

OTHER PUBLICATIONS

International Search Report in the international application No. PCT/CN2018/103852, dated Apr. 28, 2019.
(Continued)

*Primary Examiner* — Courtney D Thomas
(74) *Attorney, Agent, or Firm* — Syncoda LLC; Feng Ma (57) ABSTRACT

An imaging system includes: a micro computed tomography (micro-CT) subsystem, a specimen processing subsystem, a scanning electron microscopy (SEM) and a processor. The micro-CT subsystem includes an X-ray source and an X-ray detector, and is configured to acquire a three-dimensional image of a specimen. The specimen processing subsystem includes a focused ion beam subsystem and a mechanical cutting device. The focused ion beam subsystem is configured to process the specimen in a first processing manner, and the mechanical cutting device is configured to process the specimen in a second processing manner to obtain a target section of a target area. The SEM is located above the specimen and is configured to acquire a two-dimensional image of the target section. The processor is configured to perform three-dimensional reconstruction on the two-dimensional images to obtain a three-dimensional imaging of the specimen.

12 Claims, 11 Drawing Sheets

(51) Int. Cl.
*G01N 23/2251* (2018.01)
*G06T 7/70* (2017.01)

(52) U.S. Cl.
CPC .......... *G06T 7/70* (2017.01); *G01N 2223/401* (2013.01); *G01N 2223/418* (2013.01); *G01N 2223/419* (2013.01); *G06T 2200/04* (2013.01); *G06T 2207/10061* (2013.01); *G06T 2207/10081* (2013.01); *G06T 2207/30004* (2013.01)

(58) Field of Classification Search
CPC ....... G01N 2223/419; G06T 7/55; G06T 7/70; G06T 2200/04; G06T 2207/10061; G06T 2207/10081; G06T 2207/30004
See application file for complete search history.

(56) References Cited

FOREIGN PATENT DOCUMENTS

| | | |
|---|---|---|
| CN | 105683736 A | 6/2016 |
| CN | 108020503 A | 5/2018 |
| CN | 207610995 U | 7/2018 |
| JP | 2989559 B2 | 12/1999 |

OTHER PUBLICATIONS

Written Opinion of the International Search Authority in the international application No. PCT/CN2018/103852, dated Apr. 28, 2019.

\* cited by examiner

IMAGING SYSTEM AND METHOD FOR SPECIMEN DETECTION

CROSS-REFERENCE TO RELATED APPLICATIONS

The present application is a national stage of International Application No. PCT/CN2018/103852 filed on Sep. 3, 2018, which claims priority to Chinese Patent Application No. 201810837831.2 filed on Jul. 26, 2018, and Chinese Application No. 201821196445.1 filed on Jul. 26, 2018. The disclosures of these applications are hereby incorporated by reference in their entireties.

TECHNICAL FIELD

The present disclosure relates to the field of Scanning Electron Microscopy (SEM) technology, and in particular to an imaging system and a method for specimen detection.

BACKGROUND

With the development of scientific research and industry, there is increasingly high demand for observation of specimens. Especially in the field of biology and materials research, there is increasingly high demand for observation of a microstructure of a specimen (such as vesicles in nerve cells). Taking a need of obtaining a high-resolution three-dimensional image (3D image) of a specimen in scientific research as an example, in brain science research, it is required to obtain a three-dimensional image of a neuron cell to find out how the nerve cells are connected to each other.

In the related art, a method for performing three-dimensional imaging on a specimen generally includes: a confocal microscopy, an X-ray computed tomography (CT), and the like. However, the resolution is generally low (in the order of about tens to hundreds of nanometers) in the above-described methods. Although a scanning electron microscopy (SEM) may have a higher resolution (in the order of a few nanometers or even sub-nanometers), a penetration depth of electrons is only in the order of micrometers. Therefore, it is usually impossible to directly perform three-dimension imaging on the specimen, especially it is impossible to directly observe a region of interest (ROI) inside the specimen. Therefore, there is no effective solution for detecting and imaging specimens with a high resolution and a high penetration depth yet.

SUMMARY

In view of this, embodiments according to the disclosure provide an imaging system and a method for specimen detection, capable of detecting and imaging a specimen with a high resolution and a high penetration depth.

According to an embodiment of the disclosure, an imaging system is provided, which includes: a micro-CT subsystem, a specimen processing subsystem, an SEM and a processor. The micro-CT subsystem includes an X-ray source and an X-ray detector, and is configured to acquire a three-dimensional image of a specimen. The specimen processing subsystem includes a focused ion beam subsystem and a mechanical cutting device. The focused ion beam subsystem is configured to process the specimen in a first processing manner, and the mechanical cutting device is configured to process the specimen in a second processing manner to obtain a target section of a target area. The SEM is located above the specimen and is configured to acquire a two-dimensional image of the target section. The processor is configured to perform three-dimensional reconstruction on the two-dimensional images to obtain a three-dimensional imaging of the specimen.

In some embodiments, the processor is further configured to determine a first area of the three-dimensional image and location information of the first area. At least one of the focused ion beam subsystem or the mechanical cutting device is further configured to process an area in the specimen other than the first area to make the first area exposed or to be exposed. The micro-CT subsystem is further configured to acquire a three-dimensional image of the processed specimen. The processor is further configured to perform navigation correction on the first area based on the three-dimensional image of the processed specimen to obtain a second area, and determine location information of the second area to be location information of the target area. The location information of the target area is used by the specimen processing subsystem to process the specimen.

In some embodiments, the specimen is arranged on a specimen stage capable of moving in five degrees of freedom.

In some embodiments, an angle between an axis of the focused ion beam subsystem and a vertical direction of the specimen is θ, where θ is larger than or equal to 0, and smaller than or equal to 180 degrees.

In some embodiments, the mechanical cutting device is: a glass cutter, a stainless steel knife, a diamond cutter or a microtome.

In some embodiments, the SEM further includes an energy dispersive spectrometer (EDS) configured to acquire an energy spectrum of the specimen.

In some embodiments, the X-ray source, the X-ray detector and the specimen are arranged on a same line, the X-ray source and the X-ray detector are arranged on opposite sides of the specimen.

According to an embodiment of the disclosure, a method for specimen detection is provided and applied to an imaging system. The imaging system includes: a micro computed tomography (micro-CT) subsystem, a scanning electron microscopy (SEM), a processor, and a specimen processing subsystem including a focused ion beam subsystem and a mechanical cutting device. The method includes the following operations. The micro-CT subsystem acquires a three-dimensional image of a specimen. The processor acquires location information of a target area based on the three-dimensional image. At least one of the focused ion beam subsystem or the mechanical cutting device processes the specimen based on the location information for multiple times to expose a target section of the target area. The SEM acquires two-dimensional images of multiple target sections resulted from the multiple times of processing. The processor performs three-dimensional reconstruction on the obtained two-dimensional images to obtain a three-dimensional image of the target area.

In some embodiments, in order to obtain two-dimensional images of a plurality of target sections of the specimen, the focused ion beam subsystem or the mechanical cutting device performs tomography cutting on the target area of the specimen to obtain a first target section, and the SEM acquires a first two-dimensional image of the first target section; the focused ion beam subsystem or the mechanical cutting device performs tomography cutting on the target area of the specimen to obtain a second target section, and the SEM acquires a second two-dimensional image of the second target section. And so on, until imaging of the target area of the specimen is completed to obtain two-dimensional images of a plurality of target sections of the specimen.

In some embodiments, in order to acquire location information of the target area based on the three-dimensional image, a first area of the three-dimensional image and location information of the first area are determined. At least one of the focused ion beam subsystem or the mechanical cutting device processes an area in the specimen other than the first area to make the first area exposed or to be exposed. The micro-CT subsystem acquires a three-dimensional image of the processed specimen. Navigation correction is performed on the first area based on the three-dimensional image of the processed specimen to obtain a second area. Location information of the second area is determined to be location information of the target area.

In some embodiments, an angle between an axis of the focused ion beam subsystem and a vertical direction of the specimen is θ, where θ is larger than or equal to 0, and smaller than or equal to 180 degrees.

In some embodiments, the micro-CT subsystem includes an X-ray source and an X-ray detector. The X-ray source, the X-ray detector and the specimen are arranged on a same line, and the X-ray source and the X-ray detector are arranged on opposite sides of the specimen.

In the embodiment of the present disclosure, by acquiring a three-dimensional image of a specimen by using a micro computed tomography scanning subsystem, the specimen can be detected and imaged with a high penetration depth. By acquiring the three-dimensional image of the specimen by using the micro-CT subsystem, the resolution of detection and imaging of the specimen can be improved. Moreover, by integrating the micro-CT subsystem, an SEM, a processor, a specimen processing subsystem including a focused ion beam subsystem and a mechanical cutting device, into an imaging system, the accuracy of specimen detection is improved.

DETAILED DESCRIPTION

The details are described as follows with reference to the figures and several embodiments. It should be understood that the specific embodiments described herein are merely illustrative of the disclosure and are not intended to limit the disclosure.

Figure 1:
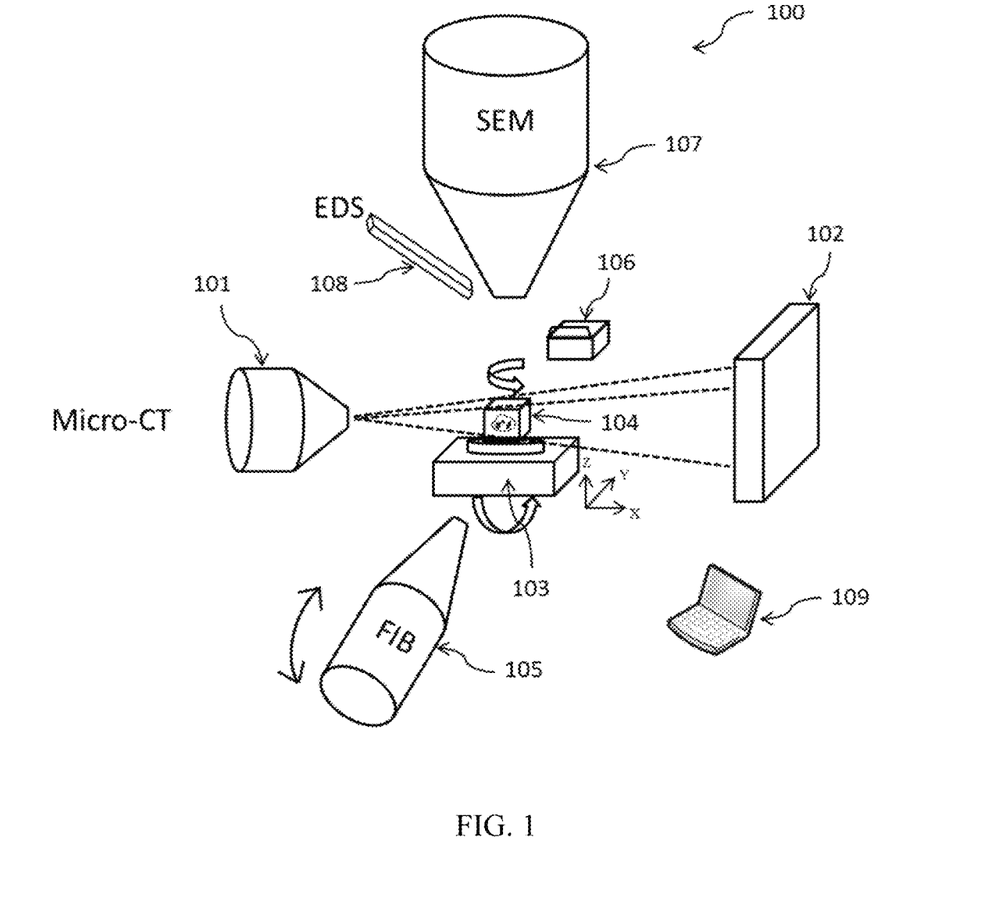
FIG. 1 is a diagram of an optional structure of an imaging system according to an embodiment of the disclosure.

A diagram of an optional structure of an imaging system according to an embodiment of the disclosure is shown in FIG. 1. The imaging system 100 includes a micro-CT subsystem including an X-ray source 101 and an X-ray detector 102. The micro-CT subsystem is used to acquire a three-dimensional image of a specimen 104. The specimen 104 is located on a specimen stage 103 capable of moving in five degrees of freedom. The movement in five degrees of freedom includes a three-dimensional translation (translation in three directions of X, Y and Z), rotation around a central axis (R) and tilt (T).

The imaging system 100 further includes a specimen processing subsystem including an FIB subsystem 105 and a mechanical cutting device 106. The specimen processing subsystem is used to obtain target sections of a target area of the specimen 104.

An optional ion source of the FIB is a liquid metal gallium ion. The FIB 105 processes the specimen 104 in a first processing manner. For example, the FIB processes the specimen 104 in a micro-nano-scale processing manner to perform tomography cutting on the specimen 104.

Figure 2A:
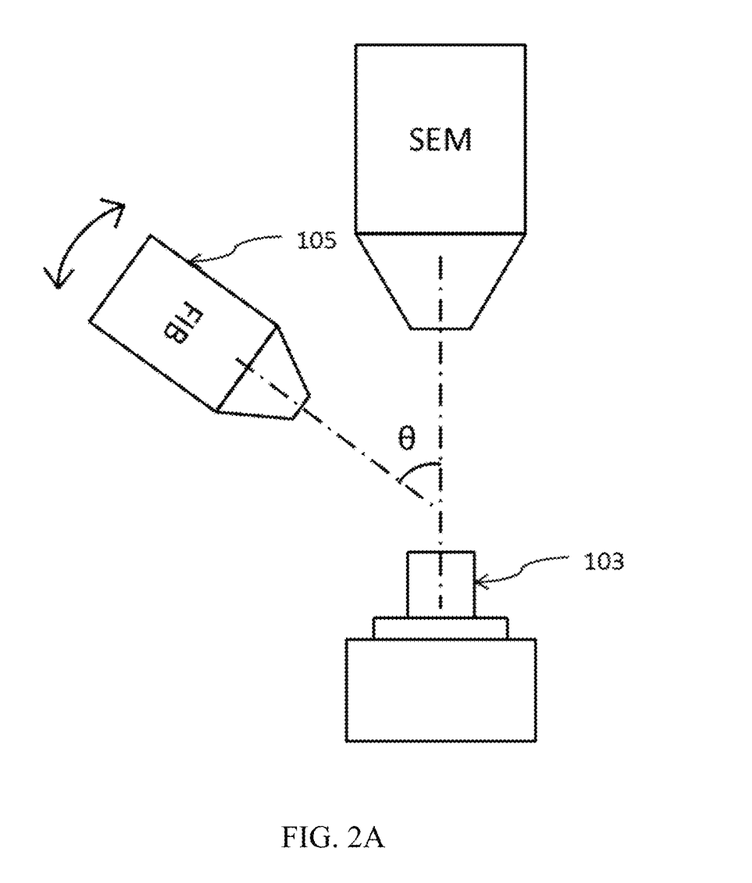
FIG. 2A is a diagram of a positional relationship between an FIB and a specimen according to an embodiment of the disclosure.

In several embodiments, a positional relationship between the FIB 105 and the specimen 104 is shown in FIG. 2A. The FIB 105 may perform pitch. An angle θ is formed between an axis of the FIB 105 and a vertical direction Z of the specimen stage 103 (or the specimen on the specimen stage 103). The angle may be adjusted by using a mechanical device, where θ is larger than or equal to 0, and smaller than or equal to 180 degrees.

The mechanical cutting device 106 processes the specimen 104 in a second processing manner. For example, the mechanical cutting device 106 processes the specimen 104 in a rough machining manner to perform tomography cutting on the specimen 104. The mechanical cutting device 106 may be selected from a group comprising at least one of: a glass cutter, a stainless steel knife, a diamond cutter or a microtome. In practice, the mechanical cutting device 106 may be selected based on the type and the cutting dimension of the specimen 104.

The imaging system 100 further includes an SEM 107 located above the specimen 104. The SEM 107 is used to acquire two-dimensional images of the target sections to detect the specimen 104 with a high resolution. A series of two-dimensional images can be formed based on multiple target sections. The two-dimensional images may include at least a secondary electrons (SE) image and a back scattered electrons (BSE) image.

The SEM 107 further includes an energy dispersive spectrometer (EDS) for acquiring an energy spectrum of the specimen 104. The SEM 107 implements the function of analyzing material composition of the specimen 104 by acquiring the energy spectrum of the specimen 104.

The imaging system 100 further includes a processor 109 for performing three-dimensional reconstruction on the acquired two-dimension images to obtain a three-dimensional image of the target area.

Figure 2B:
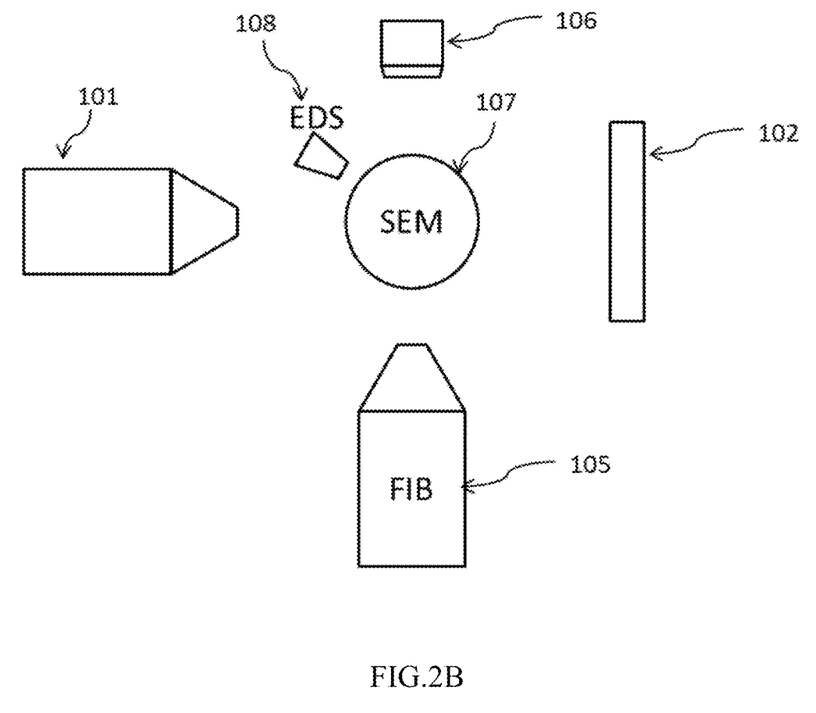
FIG. 2B is a first diagram of a top view of an imaging system according to an embodiment of the disclosure.
Figure 2C:
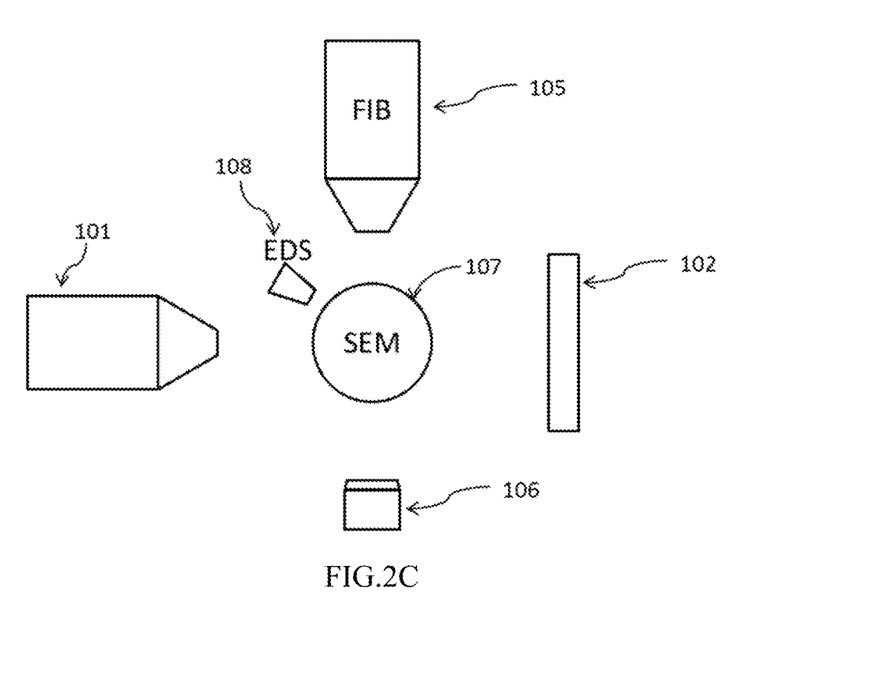
FIG. 2C is a second diagram of a top view of an imaging system according to an embodiment of the disclosure.
Figure 2D:
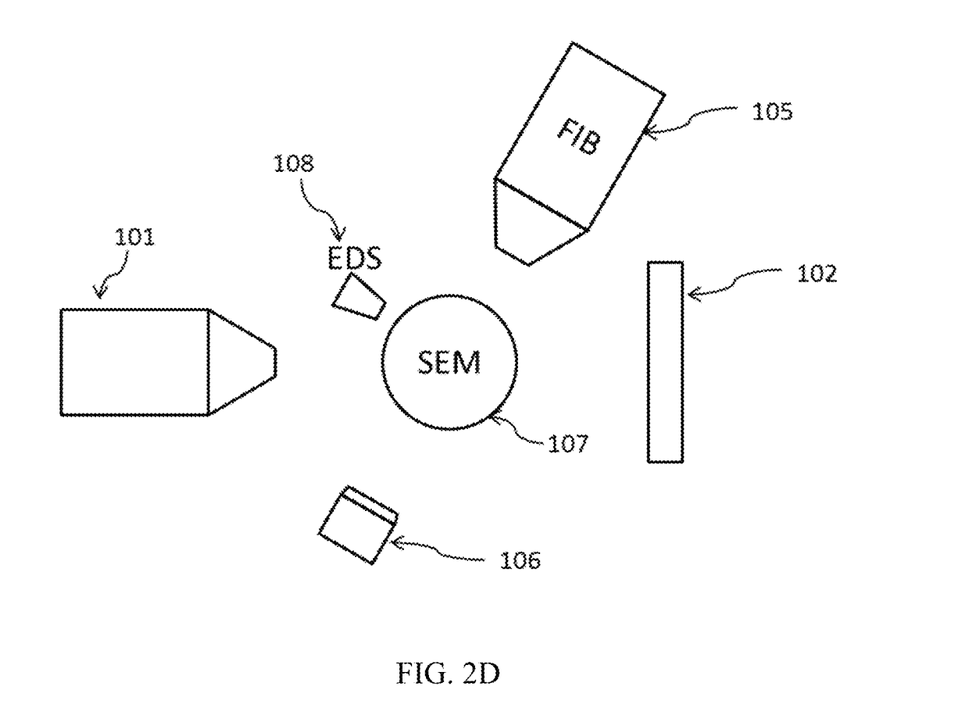
FIG. 2D is a third diagram of a top view of an imaging system according to an embodiment of the disclosure.
Figure 2E:
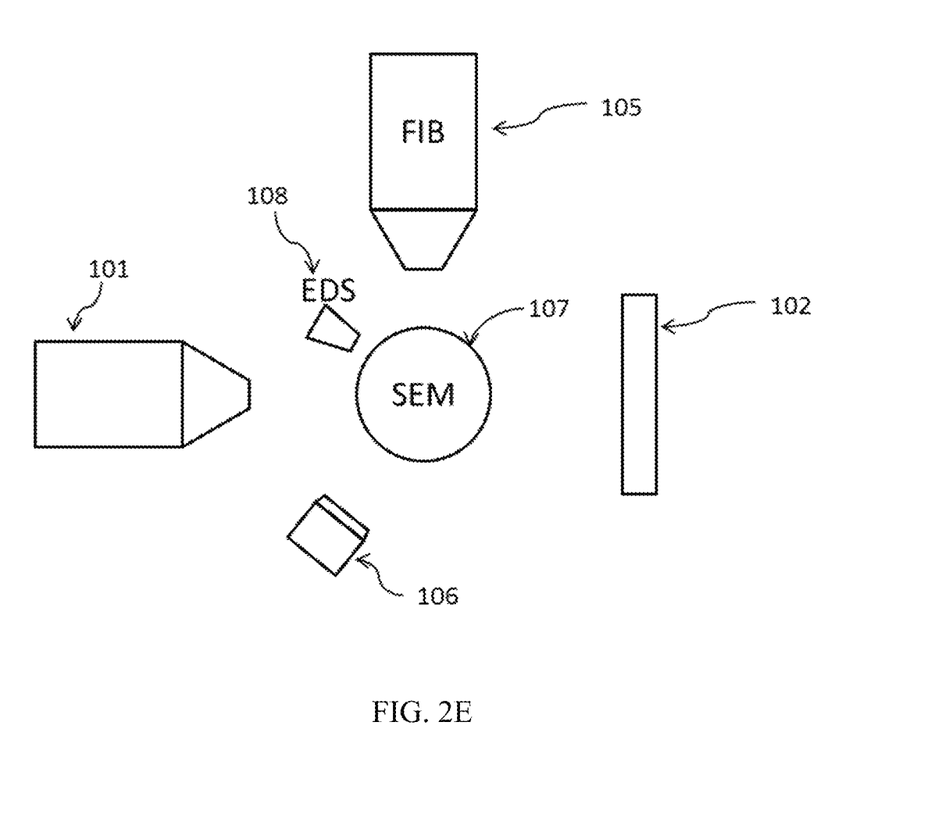
FIG. 2E is a fourth diagram of a top view of an imaging system according to an embodiment of the disclosure.

FIG. 2B, FIG. 2C, FIG. 2D and FIG. 2E are top views of the imagining system 100 according to an embodiment of the disclosure. In several optional embodiments, the X-ray source 101, the X-ray detector 102 and the specimen 104 are arranged on a same line, the X-ray source 101 and the X-ray detector 102 are arranged on opposite sides of the specimen 104. As shown in FIG. 2B, FIG. 2C and FIG. 2D, the FIB 105, the SEM 107 (or the specimen stage 103) and the mechanical cutting device 106 may be collinear. As shown in FIG. 2E, the FIB 105, the SEM 107 (or the specimen stage 103) and the mechanical cutting device 106 may be not collinear. The EDS 108 and the SEM 107 are placed adjacently. Moreover, a positional relationship between the FIB 105, the SEM 107 (or the specimen stage 103) and the specimen cutting device 106 is not limited to the positional relationships as depicted in FIG. 2B, FIG. 2C, FIG. 2D and FIG. 2E.

In several optional embodiments, at least one of the FIB 105 or the mechanical cutting device 106 are further used to process an area in the specimen 104 other than the first area, so as to make the first area exposed or to be exposed. The first area is an area to be detected in the specimen 104.

The micro-CT subsystem is further configured to acquire a three-dimensional image of the processed specimen.

The processor 109 is further configured to perform navigation correction on the first area based on the three-dimensional image of the processed specimen to obtain a second area, and determine location information of the second area to be location information of the target area. The location information of the target area is used by the specimen processing subsystem to process the specimen.

Figure 6:
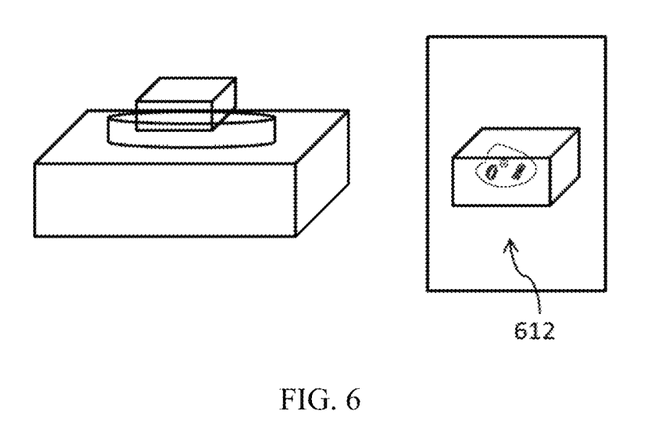
FIG. 6 is a fourth diagram of a structure of an imaging system applied to a method for specimen detection according to an embodiment of the disclosure.
Figure 7:
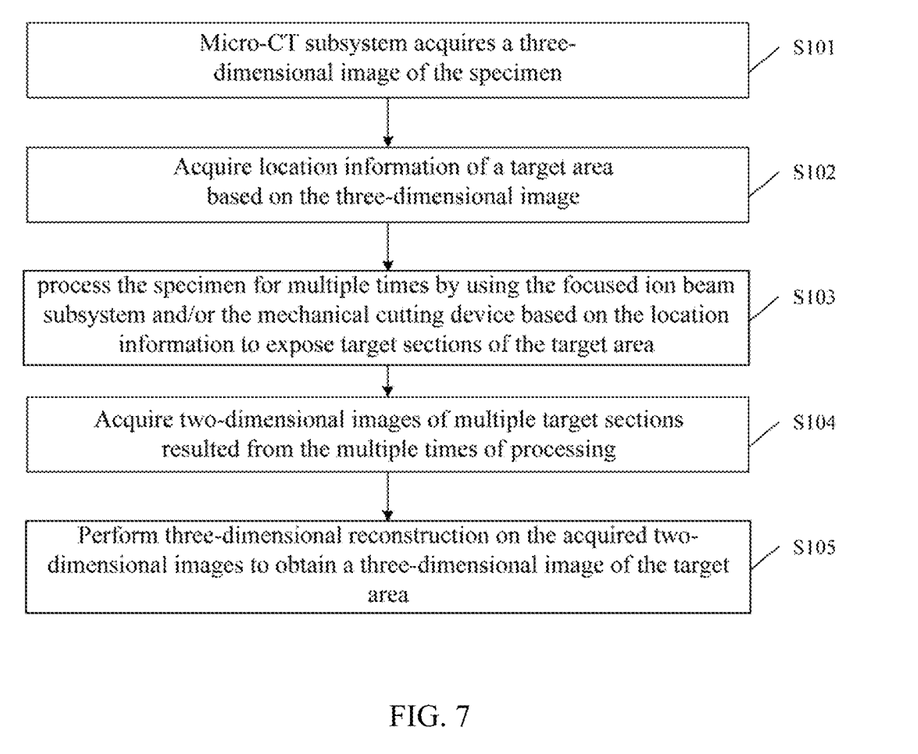
FIG. 7 is a diagram of an optional process flow of a method for specimen detection according to an embodiment of the disclosure.

Based on the above-described imaging system, embodiments according to the disclosure further provide a method for specimen detection. The method for specimen detection is applied to imaging systems as shown in FIG. 3, FIG. 4, FIG. 5 and FIG. 6, the imaging system includes: a micro-CT subsystem, an SEM, a processor, and a specimen processing subsystem including a focused ion beam subsystem and a mechanical cutting device. As shown in FIG. 7, a process flow of the detection method includes the following operations illustrated in blocks.

At block S101, a three-dimensional image of the specimen is obtained by the micro-CT subsystem.

In several embodiments, the micro-CT subsystem includes an X-ray source and an X-ray detector. The X-ray source, the X-ray detector and the specimen are arranged on a same line, and the X-ray source and the X-ray detector are arranged on opposite sides of the specimen.

Figure 3:
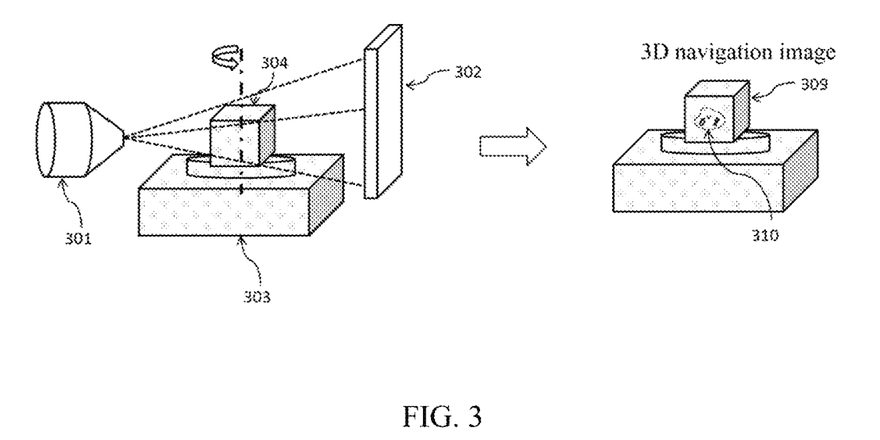
FIG. 3 is a first diagram of a structure of an imaging system applied to a method for specimen detection according to an embodiment of the disclosure.

As shown in FIG. 3, the specimen 304 is arranged on the specimen stage 305. X-ray is emitted by the X-ray source 301, passes through the specimen 304, and is projected to the detector 302. A series of projection images are obtained by a rotation of the specimen stage 305. The projection images are converted to a three-dimensional image 309 by operation, and the three-dimensional image 309 are used for a navigation chart in subsequent observation.

It should be noted that, a process of converting the projection images to a three-dimensional image can be implemented by using the prior art, and is not described here.

At block S102, location information of a target area is obtained based on the three-dimensional image.

Here, the target area is an area to be detected in the specimen.

Figure 4:
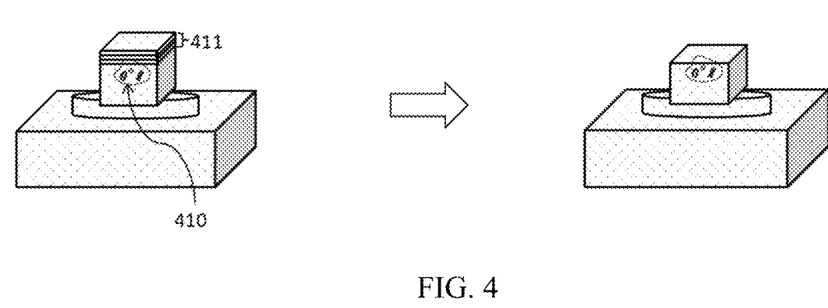
FIG. 4 is a second diagram of a structure of an imaging system applied to a method for specimen detection according to an embodiment of the disclosure.

In several embodiments, the processor in the imaging system determines a first area of the three-dimensional image and location information of the first area. An area in the specimen other than the first area is processed by using the focused ion beam subsystem and/or the mechanical cutting device processes to make the first area exposed or to be exposed. The micro-CT subsystem acquires a three-dimensional image of the processed specimen. The processor performs navigation correction on the first area based on the three-dimensional image of the processed specimen to obtain a second area, and determines location information of the second area to be location information of the target area. As shown in FIG. 3, 310 denotes a target area. As shown in FIG. 4, 410 denotes a target area, 411 denotes an area located above the target area 410 and should be removed so that the SEM may perform scanning imaging on the target area 410.

Thus, by performing navigation correction on the first area based on the three-dimensional image of the processed specimen, a deviation of the navigation chart due to deformation and displacement of the target area when the specimen is processed can be corrected, damage of the target area is reduced, thereby the accuracy of acquiring the three-dimensional of the target area is improved.

At block S103, at least one of the focused ion beam subsystem or the mechanical cutting device is used to process the specimen for multiple times based on the location information to expose target sections of the target area.

In several embodiments, the focused ion beam subsystem or the mechanical cutting device is used to perform tomography cutting on the target area of the specimen to obtain a first target section; and the SEM is used to acquires a first two-dimensional image of the first target section. The focused ion beam subsystem or the mechanical cutting device is used to perform tomography cutting on the target area of the specimen to obtain a second target section; and the SEM is used to acquire a second two-dimensional image of the second target section. And so on, until imaging of the target area of the specimen is completed to obtain two-dimensional images of a plurality of target sections of the specimen.

At block S104, two-dimensional images of multiple target sections resulted from the multiple times of processing are obtained.

In several embodiments, the focused ion beam subsystem or the mechanical cutting device is used to perform tomography cutting on the target area of the specimen to obtain a first target section; and the SEM is used to acquire a first two-dimensional image of the first target section. The focused ion beam subsystem or the mechanical cutting device is used to perform tomography cutting on the target area of the specimen to obtain a second target section; and the SEM is used to acquire a second two-dimensional image of the second target section. And so on, until imaging of the target area of the specimen is completed to obtain two-dimensional images of a plurality of target sections of the specimen.

Figure 5:
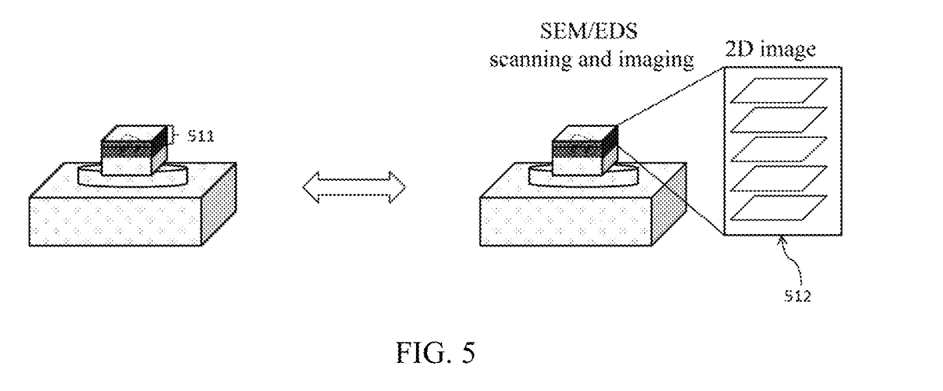
FIG. 5 is a third diagram of a structure of an imaging system applied to a method for specimen detection according to an embodiment of the disclosure.

As shown in FIG. 5, 511 denotes an area of the specimen including the target area, and 512 denotes two-dimensional images of multiple target sections.

At block S105, three-dimensional reconstruction is performed on the acquired two-dimensional images to obtain a three-dimensional image of the target area.

In several optional embodiments, a processor of the imaging system performs three-dimensional reconstruction on the obtained series of two-dimensional images to obtain a three-dimensional image of the target area. The obtained three-dimensional image is 612 as shown in FIG. 6.

The above is only a specific implementation of the disclosure, but the scope of protection of the disclosure is not limited thereto. Changes or substitutions can be easily envisioned by any person skilled in the art within the technical scope of the disclosure, should be covered by the scope of protection of the disclosure. Therefore, the scope of protection of the disclosure should be based on the scope of protection of the claims.

INDUSTRIAL APPLICABILITY

By acquiring a three-dimensional image of a specimen by using a micro computed tomography scanning subsystem, the specimen can be detected and imaged with a high penetration depth. By acquiring the three-dimensional image of the specimen by using the micro-CT subsystem, the resolution of detection and imaging of the specimen can be improved. Moreover, by integrating the micro-CT subsystem, an SEM, a processor, a specimen processing subsystem including a focused ion beam subsystem and a mechanical cutting device, into an imaging system, the accuracy of specimen detection is improved.

The invention claimed is:

1. An imaging system, comprising: a micro computed tomography (micro-CT) subsystem, a specimen processing subsystem, a scanning electron microscopy (SEM) and a processor, wherein
the micro-CT subsystem comprises an X-ray source and an X-ray detector, and is configured to acquire a three-dimensional image of a specimen;
the specimen processing subsystem comprises: a focused ion beam subsystem and a mechanical cutting device, wherein the focused ion beam subsystem is configured to process the specimen in a first processing manner, and the mechanical cutting device is configured to process the specimen in a second processing manner, to obtain a target section of a target area;
the SEM is located above the specimen and is configured to acquire a two-dimensional image of the target section; and
the processor is configured to perform three-dimensional reconstruction on the two-dimensional images to obtain a three-dimensional imaging of the specimen.

2. The imaging system according to claim 1, wherein the processor is further configured to determine a first area of the three-dimensional image and location information of the first area;
at least one of the focused ion beam subsystem or the mechanical cutting device is further configured to process an area in the specimen other than the first area to make the first area exposed or to be exposed;
the micro-CT subsystem is further configured to acquire a three-dimensional image of the processed specimen; and
the processor is further configured to perform navigation correction on the first area based on the three-dimensional image of the processed specimen to obtain a second area, and determine location information of the second area to be location information of the target area, wherein the location information of the target area is used by the specimen processing subsystem to process the specimen.

3. The imaging system according to claim 1, wherein the specimen is arranged on a specimen stage capable of moving in five degrees of freedom.

4. The imaging system according to claim 1, wherein an angle between an axis of the focused ion beam subsystem and a vertical direction of the specimen is θ, where θ is larger than or equal to 0, and smaller than or equal to 180 degrees.

5. The imaging system according to claim 1, wherein the mechanical cutting device is: a glass cutter, a stainless steel knife, a diamond cutter or a microtome.

6. The imaging system according to claim 1, wherein the SEM further comprises an energy dispersive spectrometer (EDS) configured to acquire an energy spectrum of the specimen.

7. The imaging system according to claim 1, wherein the X-ray source, the X-ray detector and the specimen are arranged on a same line, the X-ray source and the X-ray detector are arranged on opposite sides of the specimen.

8. A method for specimen detection, applied to an imaging system, wherein the imaging system comprises: a micro computed tomography (micro-CT) subsystem, a scanning electron microscopy (SEM), a processor, and a specimen processing subsystem comprising a focused ion beam subsystem and a mechanical cutting device; the method comprises:
acquiring, by the micro-CT subsystem, a three-dimensional image of a specimen;
acquiring, by the processor, location information of a target area based on the three-dimensional image;
processing, by at least one of the focused ion beam subsystem or the mechanical cutting device, the specimen based on the location information for multiple times, to expose a target section of the target area;
acquiring, by the SEM, two-dimensional images of a plurality of target sections resulted from the multiple times of processing; and
performing, by the processor, three-dimensional reconstruction on the obtained two-dimensional images to obtain a three-dimensional image of the target area.

9. The method according to claim 8, wherein processing, by at least one of the focused ion beam subsystem or the mechanical cutting device, the specimen based on the location information for multiple times, and acquiring, by the SEM, two-dimensional images of a plurality of target sections resulted from the multiple times of processing comprises:
performing, by the focused ion beam subsystem or the mechanical cutting device, tomography cutting on the target area of the specimen to obtain each of the plurality of target sections; acquiring, by the SEM, a respective two-dimensional image of the each of the plurality of target sections;
until imaging of the target area of the specimen is completed to acquire the two-dimensional images of the plurality of target sections of the specimen.

10. The method according to claim 8, wherein acquiring, by the processor, location information of the target area based on the three-dimensional image comprises:
determining a first area of the three-dimensional image and location information of the first area;
processing, by at least one of the focused ion beam subsystem or the mechanical cutting device, an area in the specimen other than the first area to make the first area exposed or to be exposed;
acquiring, by the micro-CT subsystem, a three-dimensional image of the processed specimen;
performing navigation correction on the first area based on the three-dimensional image of the processed specimen to obtain a second area; and
determining location information of the second area to be location information of the target area.

11. The method according to claim 8, wherein an angle between an axis of the focused ion beam subsystem and a vertical direction of the specimen is θ, where θ is larger than or equal to 0, and smaller than or equal to 180 degrees.

12. The method according to claim 8, wherein the micro-CT subsystem comprises: an X-ray source and an X-ray detector, wherein the X-ray source, the X-ray detector and the specimen are arranged on a same line, and the X-ray source and the X-ray detector are arranged on opposite sides of the specimen.

\* \* \* \* \*